United States Patent
Crupi et al.

(10) Patent No.: US 10,294,616 B2
(45) Date of Patent: May 21, 2019

(54) SYSTEM AND METHOD FOR RECYCLING ASPHALT USING INDUCTION HEATING

(71) Applicants: Francesco A. Crupi, Gulfport, FL (US); Hesham A. Ali, Davie, FL (US)

(72) Inventors: Francesco A. Crupi, Gulfport, FL (US); Hesham A. Ali, Davie, FL (US)

( * ) Notice: Subject to any disclaimer, the term of this patent is extended or adjusted under 35 U.S.C. 154(b) by 20 days.

(21) Appl. No.: 15/245,503

(22) Filed: Aug. 24, 2016

(65) Prior Publication Data

US 2017/0305800 A1   Oct. 26, 2017

Related U.S. Application Data

(63) Continuation-in-part of application No. 15/136,461, filed on Apr. 22, 2016.

(51) Int. Cl.
*H05B 6/06* (2006.01)
*H05B 6/10* (2006.01)
(Continued)

(52) U.S. Cl.
CPC ............ *E01C 19/08* (2013.01); *F27D 13/002* (2013.01); *H05B 6/067* (2013.01); *H05B 6/105* (2013.01);
(Continued)

(58) Field of Classification Search
CPC ...... C08L 2666/74; C08L 95/00; E01C 19/08; E01C 19/104; E01C 19/1045;
(Continued)

(56) References Cited

U.S. PATENT DOCUMENTS 1,949,716 A * 3/1934 Harsch ................. C21D 9/00
                                                        266/252
1,975,805 A * 10/1934 Smith ..................... A61L 2/02
                                                        219/776
(Continued)

FOREIGN PATENT DOCUMENTS

EP          0985768 A1    3/2000

OTHER PUBLICATIONS

Safety Data Sheet. Ergon Asphalt & Emulsions, Inc.: Jackson, MS; Material name: ARA-1P. 5512, Version #: 01, Issue date: May 5, 2015.
(Continued)

*Primary Examiner* — Tony G Soohoo
(74) *Attorney, Agent, or Firm* — Robert Varkonyi; Zagrebelsky Law P.A.

(57) ABSTRACT

An asphalt processing system is formed from a heating chamber, a transfer system and an induction heating system. A plurality of paddles, conveyor flights, or conveyor belts having a U-shaped blade move the asphalt through the system while concurrently mixing the material to ensure consistent temperatures through the asphalt cement. The asphalt is heating using one or more induction heating systems to quickly heat the asphalt to between 300° F. and 350° F. The system can include a convection system designed to collect air from the heating chamber, further heat it, and recirculate the air to enhance the asphalt heating. A water condenser can be employed to remove moisture during air recirculation, reducing moisture content in the asphalt cement. The asphalt cement is optionally then modified by addition of one or more rejuvenation oils. This system is particularly useful for recycled asphalt pavement, but can be used for all asphalt products.

27 Claims, 11 Drawing Sheets

(51) Int. Cl.
   *C08L 95/00* (2006.01)
   *E01C 19/08* (2006.01)
   *E01C 19/10* (2006.01)
   *F27D 13/00* (2006.01)

(52) U.S. Cl.
   CPC .............. *H05B 6/107* (2013.01); *C08L 95/00* (2013.01); *C08L 2666/74* (2013.01); *E01C 19/104* (2013.01); *E01C 19/1045* (2013.01); *Y02A 30/333* (2018.01)

(58) Field of Classification Search
   CPC ....... F27D 13/002; H05B 6/067; H05B 6/105; H05B 6/107; Y02A 30/333
   See application file for complete search history.

(56) References Cited

U.S. PATENT DOCUMENTS

| | | | | |
|---|---|---|---|---|
| 2,231,457 | A * | 2/1941 | Stephen | F26B 3/347 12/33.2 |
| 2,328,225 | A * | 8/1943 | Morey | H05B 6/04 219/649 |
| 2,448,062 | A * | 8/1948 | Stoltz | H05B 6/104 219/656 |
| 2,491,348 | A * | 12/1949 | Williams | H05B 6/02 219/650 |
| 2,632,091 | A * | 3/1953 | Hagopian | H05B 6/50 219/775 |
| 2,807,699 | A * | 9/1957 | Moore | H05B 6/78 219/775 |
| 2,813,502 | A * | 11/1957 | Drom | B23K 1/0053 174/152 R |
| 3,096,161 | A * | 7/1963 | Morrison | D04H 1/00 219/765 |
| 3,434,220 | A * | 3/1969 | Forster | B29B 13/06 219/700 |
| 3,560,347 | A * | 2/1971 | Ellis | B01D 5/0039 201/19 |
| 4,011,023 | A | 3/1977 | Cutler | |
| 4,276,093 | A * | 6/1981 | Pickermann | C08L 95/00 106/281.1 |
| 4,442,761 | A * | 4/1984 | Van Achterberg | A21B 5/08 426/438 |
| 4,486,172 | A * | 12/1984 | Dunning | B29B 13/023 219/388 |
| 4,978,501 | A * | 12/1990 | Diprose | A01M 21/046 422/22 |
| 6,588,973 | B1 | 7/2003 | Omann | |
| 2002/0007766 | A1 * | 1/2002 | Mischo | C08L 95/00 106/133.1 |
| 2007/0080248 | A1 | 4/2007 | Packer et al. | |
| 2008/0245359 | A1 * | 10/2008 | Williamson | A21B 1/26 126/39 C |
| 2009/0200291 | A1 * | 8/2009 | Haas | H05B 6/12 219/622 |
| 2011/0110177 | A1 * | 5/2011 | Velsor | B01F 13/0013 366/22 |
| 2011/0129296 | A1 * | 6/2011 | Van Velsor | B01F 13/0013 404/79 |
| 2011/0247525 | A1 * | 10/2011 | Nasser | E01C 19/1004 106/668 |
| 2013/0051961 | A1 * | 2/2013 | Diesner | E01C 19/48 414/507 |
| 2013/0343145 | A1 | 12/2013 | Villalobos Davila | |
| 2017/0055766 | A1 * | 3/2017 | Grimaldi | A47J 37/015 |
| 2017/0081809 | A1 * | 3/2017 | Guymon | E01C 19/46 |
| 2017/0305800 | A1 * | 10/2017 | Crupi | H05B 6/107 |
| 2017/0306570 | A1 * | 10/2017 | Crupi | E01C 19/1004 |

OTHER PUBLICATIONS

Safety Data Sheet. Ergon Asphalt & Emulsions, Inc.: Jackson, MS; Material name: ARA-2P. 5482, Version #: 01, Issue date: May 5, 2015.
Safety Data Sheet. HollyFrontier Refining & Marketing LLC: Tulsa, OK; Material name: Hydrolene H600T, Version #: 02, Issue/Revision date: May 6, 2015.
Material Safety Data Sheet. HollyFrontier Refining & Marketing LLC: Tulsa, OK; Material name: Hydrolene H110T, Hydrolene H100T, Hydrolene H90T, Hydrolene H125T, Issue date: Sep. 7, 2012.
Safety Data Sheet. American Refining Group, Inc.: Bradford, PA; Material name: Kendex MNE. 4577, Issue date: Mar. 27, 2015.
Safety Data Sheet. Tricor Refining, LLC: Bakersfield, CA; Material name: Cyclogen LE. 5576, Version #1, Issue date: Apr. 16, 2015.
Material Safety Data Sheet. Martin Asphalt Company: South Houston, TX; Material name: Cyclogen L Base Oil, Issue date: Sep. 2009.
Hazard Communication Safety Data Sheet. PVS Meridian Chemicals, Inc.: Magnolia, TX; Material name: Hydrogreen S, Creation date: Sep. 19, 2011; Revision date: Jan. 16, 2013.
Glover, et al., Evaluation of binder aging and its influence in aging of hot mix asphalt concrete: literature review and experimental design. (Texas Transportation Institute, 2009).
Kandhal & Mallick, Pavement Recycling Guidelines for State and Local Governments Participant's Reference Book. (U.S. Dept of Transportation 1997).
International Search Report and Written Opinion issued by the International Searching Authority dated Jul. 17, 2017 for corresponding international patent application No. PCT/US2017/028801.

* cited by examiner

SYSTEM AND METHOD FOR RECYCLING ASPHALT USING INDUCTION HEATING

CROSS REFERENCE TO RELATED APPLICATIONS

This application is a continuation-in-part application of U.S. application Ser. No. 15/136,461, entitled: "System and Method for Recycling Asphalt through Radiant and Convection Heating and Simultaneous Gentle Tumbling.," filed Apr. 22, 2016, which is hereby incorporated by reference into this disclosure.

FIELD OF INVENTION

The invention relates generally to a system and method for recycling used asphalt material. Specifically, the invention discloses a system and method to heat recycled asphalt/bitumen binder material controllably using induction heating and optionally convention heat via blowing heated air to create convectional heat towards the used asphalt material, while simultaneously carrying the used asphalt material along an agitating conveyor having a plurality of depressions that work to agitate and tumble the used asphalt material; whereby the convectional heat and the agitation enable uniform heating of the entire surface of the asphalt material; whereby the uniform heating of the used asphalt material inhibits moisture from surging from the used asphalt material and also helps to maintain the structural integrity of the subsequently formed rejuvenated asphalt.

BACKGROUND OF INVENTION

The asphalt used for paving refining and industrial uses is a solid or semi-solid bituminous material that is either naturally occurring, or derived from petroleum refining processes and includes paraffinic and aromatic hydrocarbons and heterocyclic compounds. In paving, mineral aggregates such as crushed stone are typically mixed with asphalt materials, producing pavement-type products suitable for vehicular or related traffic, such as those seen in Table 1. In addition to asphalt use in road and highway applications, asphalt is a commonly used material for construction purposes, such as roofing materials, water and damp-proofing products, bridge decks, racetracks, airport runways, parking lots, bicycle paths, and port facilities.

TABLE 1

Typical Constituents of Asphalt Concrete Used in Pavement Applications.

| Type of Constituent | Examples |
| --- | --- |
| Aggregate Material | mineral aggregates, crushed concrete, fly ash, sand, gravel, crushed stone, slags, screenings, recycled asphalt pavement, recycled asphalt shingles |
| Binders | bitumen/asphalt |
| Additives | cellulose fibers, synthetic mats and grids |

The performance required of any asphalt material is determined by its end use and/or application and is gauged by one or more measurable properties.

The most common type of paving composition in the United States is hot mix asphalt (HMA), which involves melting a pre-selected mixture of mineral aggregate and asphalt in a large heated tank. There are numerous mix designs used to meet climatic conditions and vehicular traffic. The mineral aggregate particle size gradation and asphalt type providing the optimum set of performance properties is referred to as the Job Mix Formula, of which there are numerous variations to satisfy the requirements of the pavement to include: vehicular traffic, climate conditions, and useful life expectancy.

Some major problems associated with the performance of hot mix asphalts (HMA) pavements can be moisture susceptibility (striping), permanent deformation (rutting), bleeding, shoving, and cracking (thermal and fatigue). The asphalt binder is selected for the paving environment to provide sufficient stiffness to resist rutting at expected high service temperatures and enough flexibility to resist fatigue and thermal cracking at intermediate and low service temperatures. Asphalts are exposed to weathering, which provokes aging due to a decrease in the maltenes phase, produced by oxidation. This asphalt aging is dependent upon the temperature and partial pressure to which the asphalt is exposed (Glover, et al., Evaluation of binder aging and its influence in aging of hot mix asphalt concrete: literature review and experimental design. (Texas Transportation Institute, 2009); chapter 2). The oxidation forms carbonyl (COO) functional groups which cause the asphalt to stiffen, becoming less elastic and viscous. As the asphalt stiffens, fatigue resistance decreases significantly, resulting in cracking and loss of structural integrity (Glover, et al., Evaluation of binder aging and its influence in aging of hot mix asphalt concrete: literature review and experimental design. (Texas Transportation Institute, 2009); chapter 2).

Once the asphalt loses structural integrity, it must be resurfaced. Resurfacing is typically performed using in situ processing of the asphalt, such as hot in-place asphalt processing, or repaving. However, those skilled in the art use a blend of virgin asphalt with existing asphalt, called Reclaimed Asphalt Pavement (RAP). For example, hot in-place asphalt processing heats the damaged pavement to 107° C. at a depth of 20 to 40 mm (¾ to 1½ in) using propane burners, followed by scarifying the pavement and blending virgin aggregate and compacted (Kandhal & Mallick, Pavement Recycling Guidelines for State and Local Governments Participant's Reference Book. (U.S. Dept of Transportation 1997); chapter 11).

Alternatively, the road can be milled and repaved. It is known that the milling of old road surfaces provides a number of advantages in preparing the old roadbed for resurfacing. Milling uses rotating drums possessing cutters disposed around the outer circumference, typically rotating opposite to the direction of drive wheels, to remove the upper layer of asphalt. It not only ensures a new, smooth and level base for the new hot mix overlay, but at the same time lowers the road bed height to maintain bridge deck clearances and curb and gutter depths. Grinding or milling is also beneficial in removing potholes, old cracks, joint seams, and ruts along with other surface damage that would quickly reappear in a new surface overlay if not repaired. The milled asphalt is collected and transported to a holding bin, and subsequently transported to a storage location or disposal landfill.

Generally, asphalt-paved highways, driveways, avenues, and streets are recyclable. This is because asphalts are mainly composed of asphaltenes and maltenes, which can be oxidized as discussed above. The majority of existing roadways, both concrete and bituminous asphalt, undergo constant repair and surface overlay with new hot mix asphalt to achieve and maintain safe and comfortable high speed riding surfaces. In most instances the new asphalt does not contain purely virgin asphalt, but includes a percentage of recycled asphalt, taken from road milling and processed for reuse. Reclaimed Asphalt Pavement (RAP) includes removed and/or reprocessed pavement materials containing asphalt and aggregates. These materials are generated when asphalt pavements are removed for reconstruction, resurfacing, or to obtain access to buried utilities. After removing the damaged asphalt from roads, asphalt recycling plants are used for recycling. Typically, asphalt recycling plants average 400 tons per hour to 600 tons per hour production ranges and 15% to 30% RAP can be injected into these plants.

To recycle asphalt, those of skill in the art add the RAP directly to virgin asphalt. The virgin asphalt is superheated, as seen in Table 2, followed by mixing the RAP and virgin asphalt together. The virgin asphalt transfers heat to the RAP during mixing, to provide adequate rheological properties for mixing and laying the roadway. However, during this process aggregates are heated above 650° F., which is the flash point for asphalt cement, and added to the asphalt cement, thereby transferring heat from the aggregate. The superheating causes material formation on the dryer, hot elevator and screen tower, requiring extensive clean up or replacement of those parts. More importantly, the heat transfer from the superheated material results in release of maltenes from the asphalt, as seen by the excessive smoke formation, and causes premature aging of the virgin asphalt, i.e. rapid oxidation due to the high temperatures.

the virgin asphalt. Another problem is that Plant productive capacity drops off dramatically when running RAP due to exhaust system and dryer burner overloads from RAP steam blockages within dryers.

Moreover, rapid heating of the asphalt material to heat too abruptly causes surges of steam that damage the recycling system, and also degrade the structural integrity of the asphalt cement.

While current methods provide for low-concentrated use of reclaimed asphalt, resulting asphalt mixes typically possess comprised performance with respect to wear. As such, there is an unmet need to provide novel processing systems to rejuvenate reclaimed asphalt that possess aging and temperature tolerance properties that mimic virgin asphalt.

SUMMARY OF THE INVENTION

An asphalt processing system is provided. The asphalt processing system is formed from a heating chamber, having a floor, ceiling, and four walls, a transfer system and an induction heating system. The heating chamber includes an input is disposed on the ceiling or an upper half of one of the walls, and an output is disposed on the floor or within a lower half of one of the vertical walls. In some variations, one or more bins is provided upstream of the input, meaning asphalt binder or asphalt cement constituents like aggregates

TABLE 2

Temperature Requirements for Virgin Asphalt in for RAP-Virgin asphalt mixing to meet desired RAP and moisture content (taken from Kandhal & Mallick, Pavement Recycling Guidelines for State and Local Governments Participant's Reference Book. (U.S. Dept of Transportation 1997); chapter 5).

| Recycled asphalt composition | Water content (%) | Virgin asphalt temperature to achieve recycled mix discharge temperature of: | | | |
|---|---|---|---|---|---|
| | | 104° C. (220° F.) | 115° C. (240° F.) | 167° C. (260° F.) | 138° C. (280° F.) |
| 10% RAP/ 90% virgin | 0 | 121° C. (250° F.) | 138° C. (280° F.) | 152° C. (305° F.) | 163° C. (325° F.) |
| | 1 | 127° C. (260° F.) | 143° C. (290° F.) | 154° C. (310° F.) | 168° C. (335° F.) |
| | 3 | 138° C. (280° F.) | 149° C. (300° F.) | 163° C. (325° F.) | 174° C. (345° F.) |
| | 5 | 193° C. (290° F.) | 157° C. (315° F.) | 168° C. (335° F.) | 182° C. (360° F.) |
| 30% RAP/ 70% virgin | 0 | 157° C. (315° F.) | 179° C. (345° F.) | 191° C. (375° F.) | 207° C. (405° F.) |
| | 1 | 168° C. (335° F.) | 185° C. (365° F.) | 202° C. (395° F.) | 218° C. (425° F.) |
| | 3 | 196° C. (385° F.) | 213° C. (415° F.) | 229° C. (445° F.) | 246° C. (475° F.) |
| | 5 | 224° C. (435° F.) | 241° C. (465° F.) | 257° C. (495° F.) | 274° C. (525° F.) |
| 50% RAP/ 50% virgin | 0 | 210° C. (410° F.) | 235° C. (455° F.) | 257° C. (495° F.) | 282° C. (540° F.) |
| | 1 | 240° C. (465° F.) | 268° C. (515° F.) | 288° C. (550° F.) | 310° C. (590° F.) |
| | 3 | 302° C. (575° F.) | 327° C. (620° F.) | 349° C. (660° F.) | 374° C. (705° F.) |
| | 5 | 365° C. (690° F.) | 390° C. (735° F.) | 413° C. (775° F.) | 438° C. (820° F.) |

While the temperatures in Table 2 have been deemed appropriate to achieve the desired mix temperature at the exit, temperatures are higher due to the recycling system design. For example, when cold wet RAP is injected into hot mix plants, the super-heated virgin aggregates (600° to 900° Fahrenheit) conductively transfer enough heat to the cold wet RAP for drying and heating all materials to a mixing temperature of 300° F. However, it is common that the sudden and violent steam expansion that is created when the super-hot aggregate (600° to 900° Fahrenheit) encounters the cold wet RAP instantly overloads exhaust system airflow capacity and results in fracturing of the asphalt. Such fracturing results in the asphalt mix gradations drifting out of specifications. Further, this superheating process leads to excessively high temperatures to dry and heat RAP and can therefore inflict heat damage, premature wear, and failure to are able to fall or be transported easily to the input. The exterior of the heating chamber is optionally covered—partially or fully—in insulation. In some variations, the insulation is alumina-silica insulation, cellulose insulation, or combinations thereof.

The transfer system is disposed in the interior of the heating chamber, comprising a plurality of sockets rotatably disposed in the interior of the heating chamber with at least one drive member in communication with the plurality of sockets. As such, when the plurality of sockets spin, the at least one drive member moves along a predetermined path. The plurality of sockets are optionally in mechanical communication with a drive system, such as a motor. In some variations, the plurality of sockets are attached to a drive shaft, which extends through one of the vertical walls of the heating chamber and is capable of rotating. The at least one drive member is optionally a drive chain, a plurality of drive chains, a drive cable, or a plurality of drive cables. At least one transfer unit mounted to the at least one drive member. The at least one transfer unit is optionally a paddle, a conveyor belt, a U-shaped flight, or a combination of the aforementioned transfer units. Where the at least one transfer unit is a paddle, the paddle is optionally disposed adjacent to the at least one induction plate and designed to scrape against the at least one induction plate thereby mixing the asphalt.

The induction heating system, comprises at least a first induction plate composed of a magnetic material adapted to heat upon exposure to magnetic forces, and at least a first induction heating coil disposed in the interior of the heating chamber, and in magnetic communication with the at least a first induction plate. The first induction plate is optionally ferromagnetic. In some variations, the induction heating system also includes at least a second induction plate composed of a magnetic material adapted to heat upon exposure to magnetic forces, disposed in the interior of the heating chamber, and at least a second induction heating coil disposed in the interior of the heating chamber, in magnetic communication with the at least a second induction plate. In specific variations of the invention, the first induction plate is disposed about the floor of the heating chamber and the second induction plate disposed about in the middle of the heating chamber. In some embodiments, the induction heating coils are disposed adjacent to the induction plates. Optionally a plurality of channel rails are disposed on the transverse edges of the second induction plate. Similarly, in some variations of the invention a plurality of channel rails are optionally disposed on the transverse edges of the first induction plate, or disposed on the transverse edges of both the first and second induction plates.

The asphalt processing system optionally includes at least one convection system. The convection system is formed of a convection system input in fluid communication with the interior of the heating chamber, with a blower in fluid communication with the convection system input, and a convection system output in fluid communication with the blower. The blower comprises a blower input, a fan, and a blower output. At least one heating element is optionally included in the convection system. The heating element is disposed in the convection system input, adjacent to the blower output, or both, and can include 1, 2, 3, 4, 5, 6, 7, 8, 9, 10, 11, 12, 13, 14, 15, 16, 17, 18, 19, or 20 heating elements. Optional heating elements are at least one convection induction plate disposed on the walls of the convection system, a convection induction plate disposed in the interior of the convection system input, output, or both, convection induction wire mesh disposed in the interior of the convection system input, output, or both, or one or more convection induction heating tube(s) disposed in the interior of the convection system input, output, or both. The convection system optionally includes a plurality of ducts in fluid communication with the blower output. The ducts provide a path to direct the heated air to asphalt cement. The plurality of ducts include a horizontal transfer tube, a first transfer end and a second transfer end, in fluid communication with the blower output. A first vertical transfer tube having an upper first transfer tube end and a lower first transfer tube end is in fluid communication with the first transfer end. A second vertical transfer tube having an upper second transfer tube end and a lower second transfer tube end is in fluid communication with the second transfer end. A plurality of output jets, are disposed on the lower first transfer tube end and the lower second transfer tube end. The number of output jets may be altered as would readily be apparent to one of skill in the art upon review of the specification. However, it is envisioned that the system includes 2, 4, 6, 8, 10, 12, 14, 16, 18, or 20 jets. The output jets are optionally disposed adjacent to the second induction plate, or the first half of the first induction plate, thereby directing air onto asphalt cement as the asphalt cement traverses the second induction plate or the first half of the first induction plate. The convection system also optionally includes at least one duct, wherein the at least one system input duct disposed on the horizontal ceiling of the heating chamber. One or more openings collect air from the interior of the heating chamber and transfer the air to the convection system input. A water condenser is optionally attached to the convection system input and further comprises a condenser input, water condenser chamber in fluid communication with the water condenser input, and a water condenser output.

Also disclosed is a method of manufacturing an asphaltic concrete using the aforementioned system. The asphalt is optionally RAP, virgin asphalt or a combination thereof. Asphalt, as asphaltic concrete or asphalt cement, is added to the system along with any cement constituents, such as aggregates, and the induction heating system activated by applying a magnetic field causing the first induction plate, second induction plates, where applicable, and any further inductions plates to heat. The asphaltic concrete mix is placed onto one or more of the induction plate, where the induction plate is between 300° F. and 350° F. Nonlimiting examples include 300° F., 305° F., 310° F., 315° F., 320° F., 325° F., 330° F., 335° F., 340° F., 345° F., or 350° F. The asphalt concrete mix is moved along the induction heating element, and the asphaltic concrete mix is mixed while moving along the induction plate. In certain variations, the asphaltic concrete mix is churned by the linear movement of the at least one transfer unit, due to a U-shaped leading face on the at least one transfer unit adapted to enable the churning of the asphaltic concrete mix. This forms a heated mix, which is expelled from the asphalt processing system.

Optionally, the heated mix is modified, by placing the heated mix into a rejuvenation chamber, and adding at least one modifier to the asphaltic heated mix. The at least one modifier is a rejuvenating oil, virgin asphalt cement, coarse aggregates, fine aggregates, or a combination thereof. The heated mix is then stirred or mixed with the at least one modifier to form a modified heated mix. In some variations, the rejuvenation chamber is heated. In these variations, the heating of the rejuvenation chamber possesses at least one rejuvenation induction heating plate composed of a magnetic material adapted to heat upon exposure to magnetic forces, where the at least one rejuvenation induction heating plate is in thermal contact with the rejuvenation chamber, and at least one rejuvenation induction heating coil in in magnetic communication with the at least one rejuvenation induction heating plate. A magnetic field is applied to heat the at least one rejuvenation induction heating plate.

Useful rejuvenating oils include naphthenic-based oils, anionic polymer solutions, mixtures of organic acids, resin acids, fatty acids, esterified fatty acids, aromatic oils, or combinations thereof.

Cyclogen® L (Tricor Refining, LLC, part of Ergon Asphalt & Emulsions, Inc., Jackson, Miss.), is a low viscosity naphthenic-based oil formed of heavy naphthenic distillate solvent extract and heavy naphthenic petroleum distillate. It is asphalt free, containing 0% asphaltene, but composed of the maltenes, saturates, and acidiffins to restore the aged binder. Cyclogen® LE (Tricor Refining, LLC, part of Ergon Asphalt & Emulsions, Inc., Jackson, Miss.), is an emulsion of hydrotreated heavy naphthenic petroleum distillate and heavy naphthenic distillate solvent extract in a cationic water solution. These recycling agents are refined from a naphthenic wax-free crude source which restore select maltenes that have oxidized from asphalt binder to rebalance the chemical composition of the aged asphalt.

ARA-1P and ARA-2P (Paragon Technical Services, Inc., part of Ergon Asphalt & Emulsions, Inc., Jackson, Miss.) are anionic emulsions of water, asphalt and heavy naphthenic distillate solvent extract. ARA-2P contains double the polymer amount included in ARA-1P.

The Hydrogreen® oils are a mixture of long chain and tricyclic organic acids, resin acids, fatty acids, esterified fatty acids and vegetable oils, used as a viscosity cutting agent or as a powerful penetrating oil and co-mingling agent for Recycled Asphalt Pavement. The materials are sold as a fluid Hydrogreen rejuvenator, like Hydrogreen® S (Asphalt and Wax Innovations), and oil-based semi-fluid rejuvenators, like Hydrogreen® HFP.

The aromatic oils are asphalt modifiers with high aromatic content. Hydrolene® H90T (HollyFrontier Corp., Tulsa, Okla.), composed of heavy paraffinic distillate solvent extract. Hydrolene® H600T (HollyFrontier Corp., Tulsa, Okla.), composed of residual oil solvent extract.

Paraffinic oils are materials having about half aromatic and half naphthenic molecules. They are used to maintain compatibility between the asphalt and the rejuvenator oil. Kendex MNE (American Refining Group, Bradford, Pa.), is composed of heavy paraffinic petroleum neutral distillate solvents.

Motor oils are composed of petroleum-based hydrocarbons, polyalphaolefins, and polyinternal olefins. Conventional motor oils having an SAE rating of 10W30 have been examined as rejuvenating oils, and found to be useful. A measured amount of the said rejuvenating agents is to be added such that the Performance Grade, Viscosity, or penetration of the asphalt cement in the mixture matches that of the mix design. Softening curves or blending charts are commonly used to calculate the required amount of rejuvenating agent, and it would be within the ordinary skill in the art to utilize such curves or charts in determining the amount of rejuvenating oils to add to the mix.

Some variations of the invention include at least one convection system to heat the air and provide convection heating in addition to induction heating. In these variations, the convection system is provided, as discussed above. Air is collected from the interior of the heating chamber in the convection system input, and passed over the convection system heating element. The heated air is then expelled into the interior of the heating chamber.

Optionally, moisture is extracted from the air. A water condenser is utilized, comprising a duct in fluid communication from the interior of the heating chamber or in fluid communication with the convection system input, a condensing chamber adapted to condense water, where the condensing chamber is in fluid communication with the duct and a dry air exit, in communication with the condensing chamber and the duct. Air is drawn into the condensing chamber and moisture in the air allowed to condense. The dry air is then returned to the convection system.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

As used herein, "about" means approximately or nearly and in the context of a numerical value or range set forth means±15% of the numerical.

As used herein, "asphalt cement" refers to a tar-like substance, a type of bitumen that occurs naturally or is obtained from the distillation of coal tar, wood tar or petroleum.

As used herein, "asphaltic concrete" refers to a bituminous paving mixture that is prepared, using asphalt cement or asphalt binder with one or more aggregates. Asphaltic concrete is typically prepared in a hot-mix asphalt plant or warm-mix asphalt plant.

As used herein, "drive member" means a device capable of translating rotational movement into linear movement. The drive member is moved through interaction with a device undergoing rotational movement, and upon cessation of the interaction with the device undergoing rotation movement, moves in a linear direction.

As used herein, "transfer unit" means a device capable of moving asphaltic concrete along a path.

As used herein, "working mix" refers to an asphaltic concrete readied for paving.

As used herein, "leading edge" means the edge of a paddle, blade, or other device which is a frontal edge based on the direction that the paddle, blade or device is moving.

As used herein, "substantially" means largely if not wholly that which is specified but so close that the difference is insignificant.

As used herein, "PG Rating" is defined as the average seven-day maximum and the single-day minimum pavement design temperature, in degrees Celsius, wherein the maximum is determined 20 mm below the surface of the pavement and the minimum is determined at the surface of the pavement.

As used herein, "RAP" or "reclaimed asphalt pavement" means asphalt that was collected from a prior application, such as from a road. RAP includes removed and/or reprocessed pavement materials containing asphalt cement and aggregates.

An asphalt recycling and processing system is provided for preparing asphalt binder for use. The system includes a transfer system designed to mix the asphaltic concrete, through churning of the asphalt as it moves through the processor. The asphalt cement is heated via an induction system Example 1

Figure 1A:
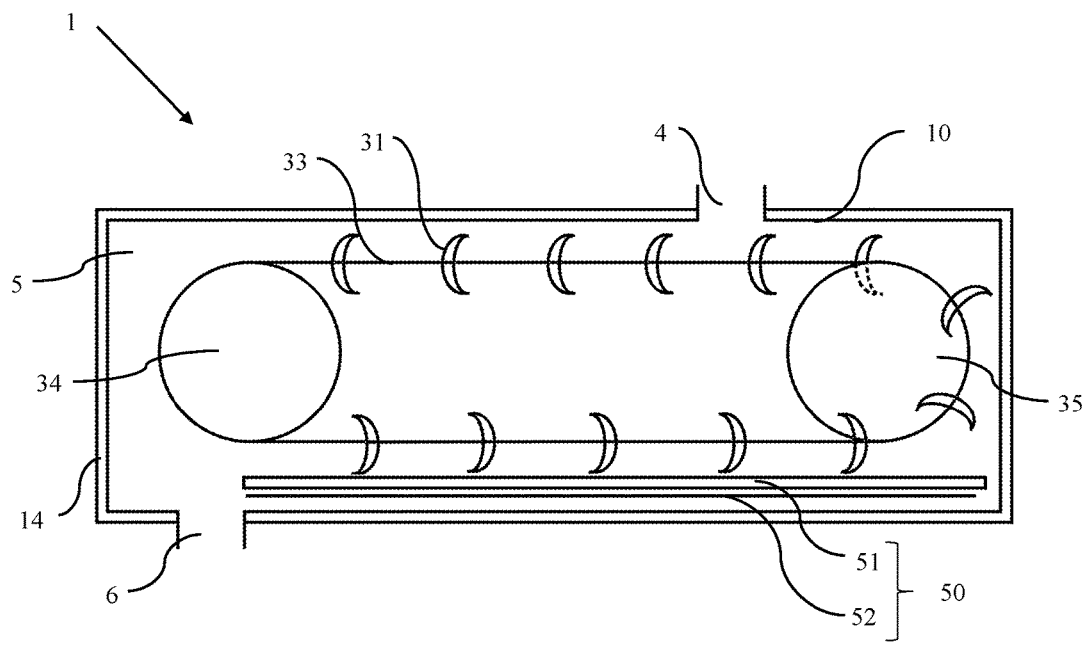
FIG. 1A is a cross sectional view of a first embodiment of the asphalt recycling system heating system.

RAP processor 1 is composed of RAP transfer system 30 and induction heating system 50, as seen in FIG. 1A. RAP transfer system 30 and induction heating system 50 are enclosed in heating chamber 5, which comprises chamber wall 10, and has input 4 for accepting asphalt cement at one end of the RAP processor and output 5 for releasing heated asphaltic concrete from RAP processor 1 opposite input 4. Wall insulation 14 is formed of Fiberfax® alumina-silica insulation and disposed on wall 10 to limit heat transfer and escape from RAP processor 1. RAP transfer system 30 is composed of chain sprocket set 34 and ancillary chain sprocket set 35, which are rotatably mounted to chamber wall 10 or a frame in RAP processor 1. One chain sprocket set, such as chain sprocket set 34 is in mechanical communication with a drive system. Without limiting the scope of the invention, as an example chain sprocket set 34 is attached to a drive shaft that extends through chamber wall 10. The drive shaft is attached to a drive motor, for example the drive shaft is mounted to the output of a drive motor or attached to a drive chain that connects to the output of a drive motor. Paddle chain set 33 extends between chain sprocket set 34 and ancillary chain sprocket set 35. At least one paddle 31 is mounted to paddle chain set 33. Alterations to RAP transfer system 30, such as the alterations described in Example 2, can be made to RAP processor 1.

Induction system is formed of induction plate 51 and induction coil 52 disposed below the induction plate. Induction plate is disposed on the lower horizontal wall of chamber wall 10, adjacent to paddle 31 such that paddle 31 scrapes asphalt cement from induction plate 51. Induction plate 51 is formed of a ferromagnetic material or composite containing ferromagnetic material, such as CHT400. Induction coil 52 is disposed under induction plate 51 and comprises an induction magnetic designed to heat induction plate 51 through induction heating.

Figure 1B:
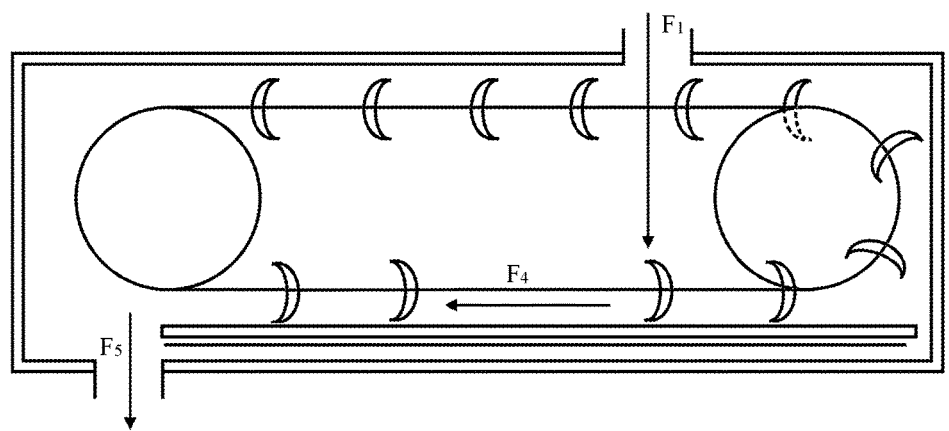
FIG. 1B is a cross sectional view of a first embodiment of the asphalt recycling system heating system showing the path of asphalt through the system.

Asphalt cement—either by itself or integrated in asphaltic concrete—is introduced into RAP processor 1 at input 4, and travels along path $F_1$, as seen in FIG. 1B. The asphalt lands onto induction plate 51 as asphaltic concrete and is collected by paddle 31 and pushed along the induction plate, traveling path $F_4$. The induction coil, located below the induction plate, i.e. between the induction plate and chamber wall, heats the induction plate through inductive heating, and the heat is transferred to asphalt cement as the asphalt traverses the length of the induction plate. Induction plate 51 is sufficiently dimensioned to allow the asphalt cement to absorb heat gradually, i.e. the asphalt cement does not heat above about 400° F. Paddle 31 possess a U-shaped blade, as seen in FIGS. 2A through 3E, allowing paddle 31 to lift the asphaltic concrete during horizontal movement and churn the asphaltic concrete allowing for mixing of the asphalt as it traverses path $F_4$. Upon reaching the end of induction plate 51, the asphaltic concrete reaches output 6 and exits RAP processor 1 via path $F_5$.

Example 2

Figure 2A:
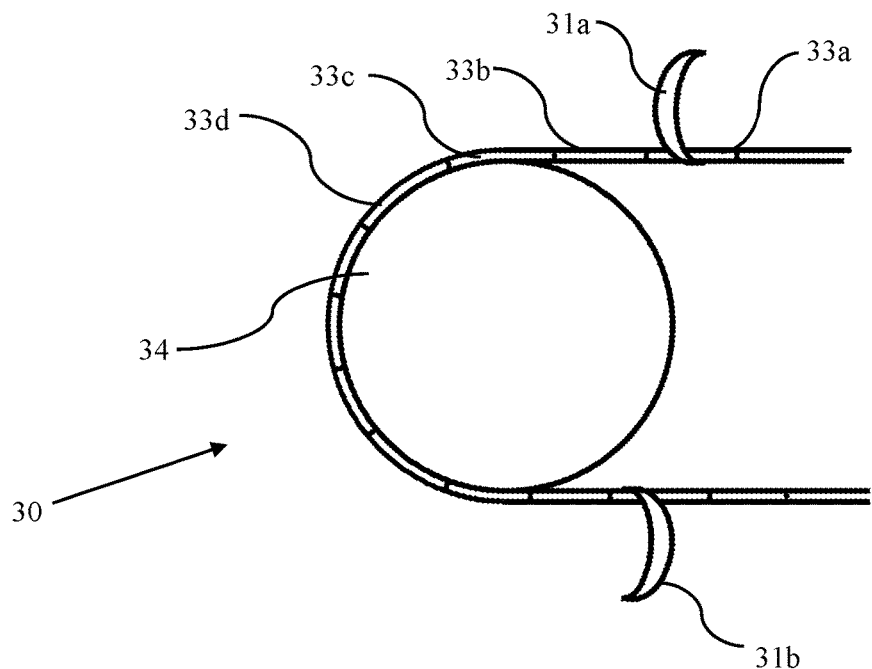
FIG. 2A is a cross sectional view of a first embodiment of a RAP transfer paddle attached to the paddle chain.
Figure 2B:
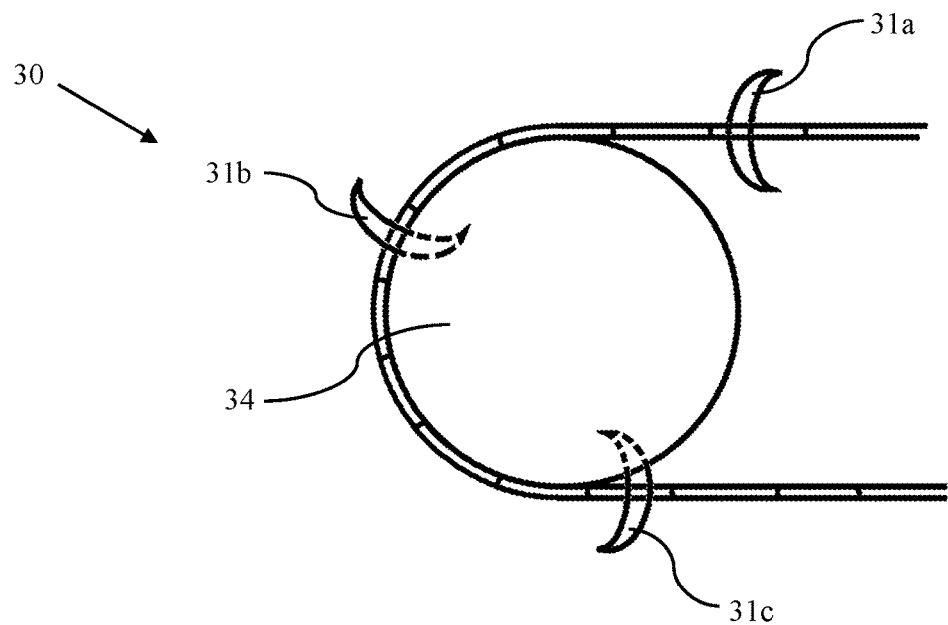
FIG. 2B is a cross sectional view of a second embodiment of a RAP transfer paddle attached to the paddle chain.
Figure 3A:
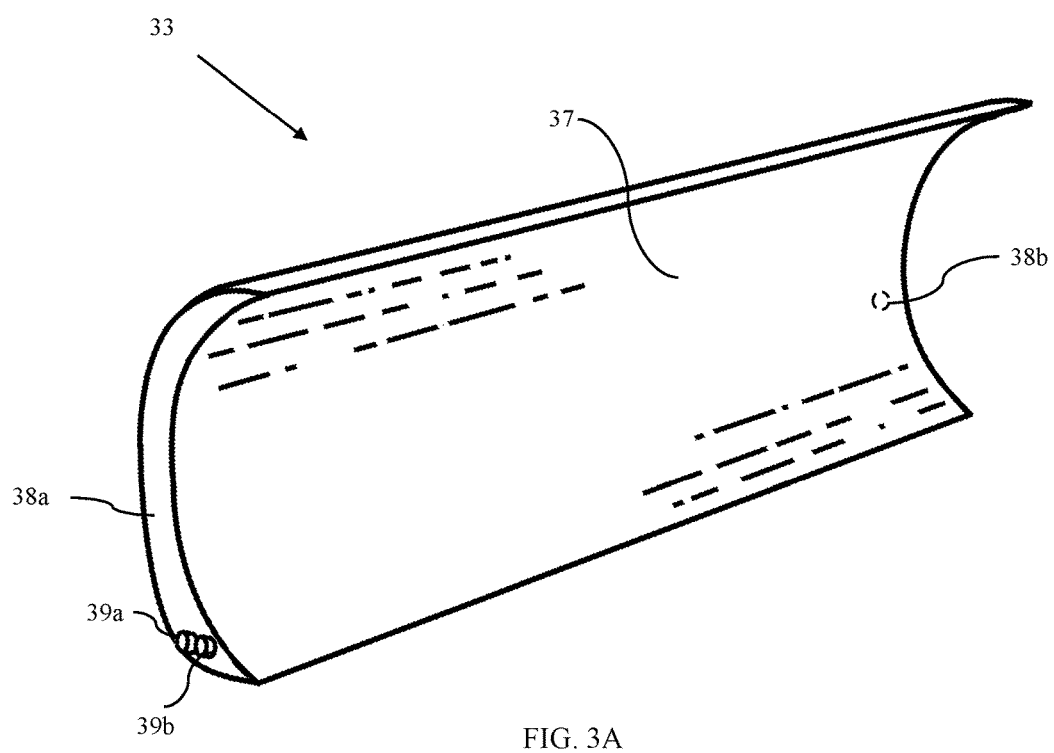
FIG. 3A is an isometric view of a first embodiment of a RAP transfer paddle.
Figure 3B:
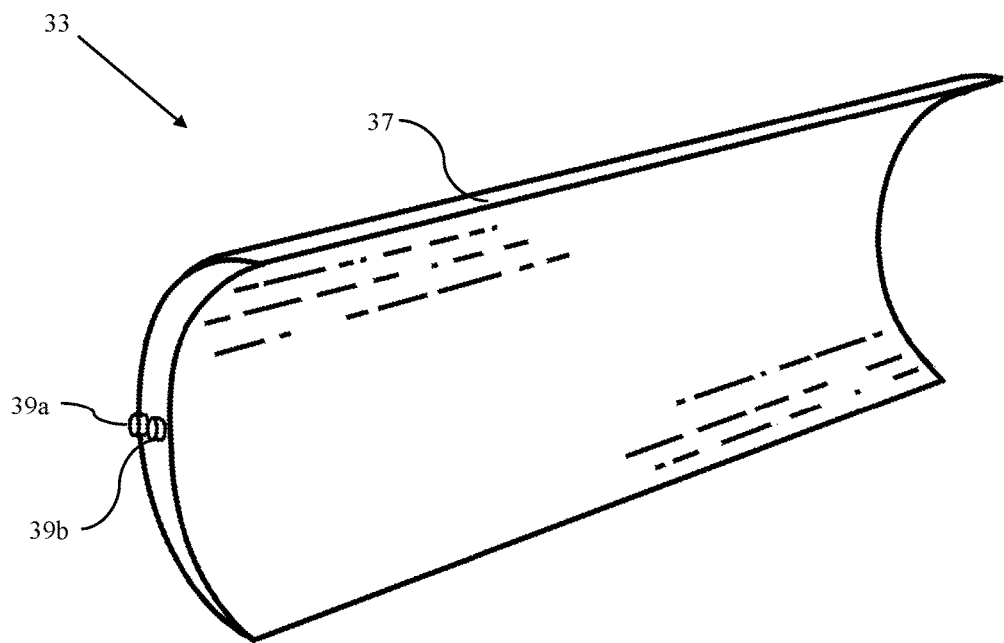
FIG. 3B is an isometric view of a second embodiment of a RAP transfer paddle.
Figure 3C:
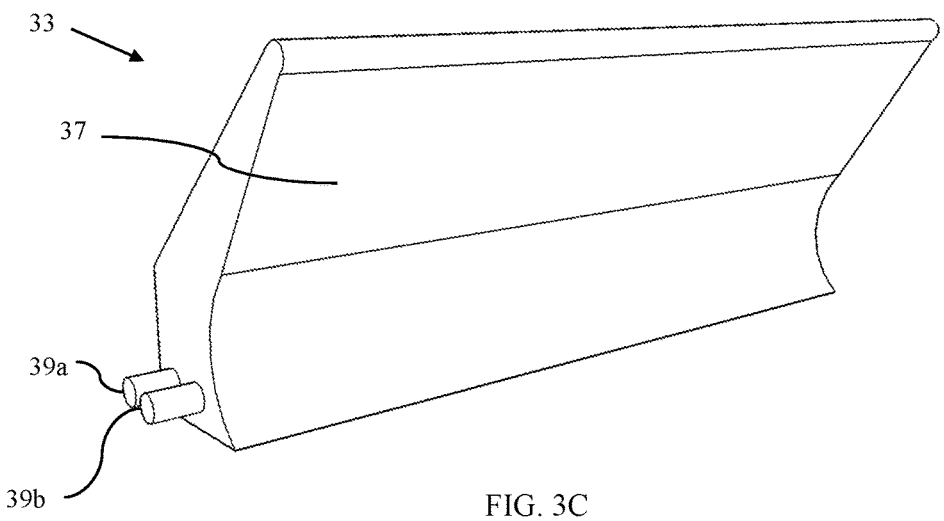
FIG. 3C is an isometric view of a third embodiment of a RAP transfer paddle.

RAP transfer system 30 can vary based on the desired characteristics of the system. The RAP transfer system is formed of two sprockets sets on either side of the RAP processor, i.e. first chain sprocket set 34a and second chain sprocket set 34b on one end of the RAP processor and first ancillary chain sprocket set 35a and first ancillary chain sprocket set 35b on the opposite end of the RAP processor. The distance between first chain sprocket set 34a and second chain sprocket set 34b or first ancillary chain sprocket set 35b is sufficient to permit paddle 31 to pass between the sprocket set. This allows paddle 31 to be attached to paddle chain 33 in various configurations. For example, paddle 31 can have attaching points on the lower edge of the paddle, as seen in FIG. 2A, or at the middle of the paddle, as seen in FIG. 2B. Paddle chain 33 is formed of a plurality of sections, 33a, 33b, 33c, 33d, etc., with each paddle attached to a single section of chain. Paddle 31 further comprises paddle blade 37 having blade edges. A plurality of mounting points are disposed on first blade edge 38a, as seen in FIG. 3A, allowing paddle 31 to be mounted along its lower edge, as depicted in FIG. 2A. While the mounting points can vary with respect to shape and design, as would readily be envisioned by one of skill in the art upon review of this disclosure, paddle 31 possesses first mounting pin 39a and second mounting pin 39b, which are dimensioned to be accepted by mounting holes in the paddle chain. A further set of mounting points are disposed on second blade edge 38b, which are obscured in the image. Alternatively, first mounting pin 39a and second mounting pin 39b are disposed in the middle of first blade edge 38a and second blade edge 38b, seen in FIG. 3B, allowing paddle 31 to be mounted along its center section, as depicted in FIG. 2B. In alternative embodiments, paddle 31 possesses a blade having a thicker middle section and base, as seen in FIG. 3C, allowing for improved structural support and less fatigue.

Figure 3D:
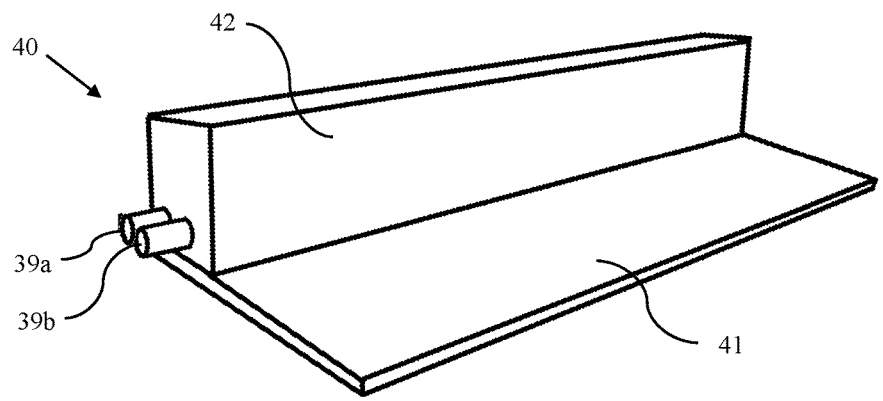
FIG. 3D is an isometric view of a first embodiment of a RAP transfer conveyor system.
Figure 3E:
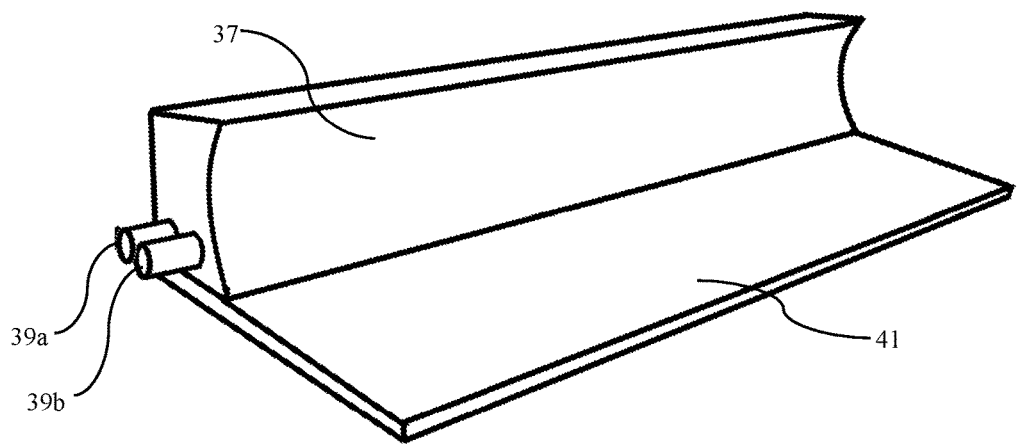
FIG. 3E is an isometric view of a second embodiment of a RAP transfer conveyor system.

Alternatively, RAP transfer system 30 uses conveyor system 40. Conveyor system 40 comprises conveyor base 41, which can be a plate, mesh, or other material known in the art. In a first embodiment of the conveyor system, conveyor back 42 is disposed on the trailing edge of conveyor base 41, ensuring the asphaltic concrete travels at a desired speed, as seen in FIG. 3D. First mounting pin 39a and second mounting pin 39b are disposed on conveyor back 42, allowing conveyor system 40 to connect to paddle chain 33. Conveyor system 40 is in communication with rollers or other means to cause conveyor base 41 to agitate. The agitating conveyor is configured to tumble the individual components of the asphaltic concrete thereby mixing the asphaltic concrete and improving the efficaciously of the asphalt cement with respect to absorbing heat in a uniform manner. In a second embodiment of the conveyor system 40, conveyor back 42 is paddle blade 37, seen in FIG. 3E. The second embodiment provides the agitation of the conveyor, in conjunction with the churning of the U-blade configuration of paddle blade 37.

Example 3

Figure 4:
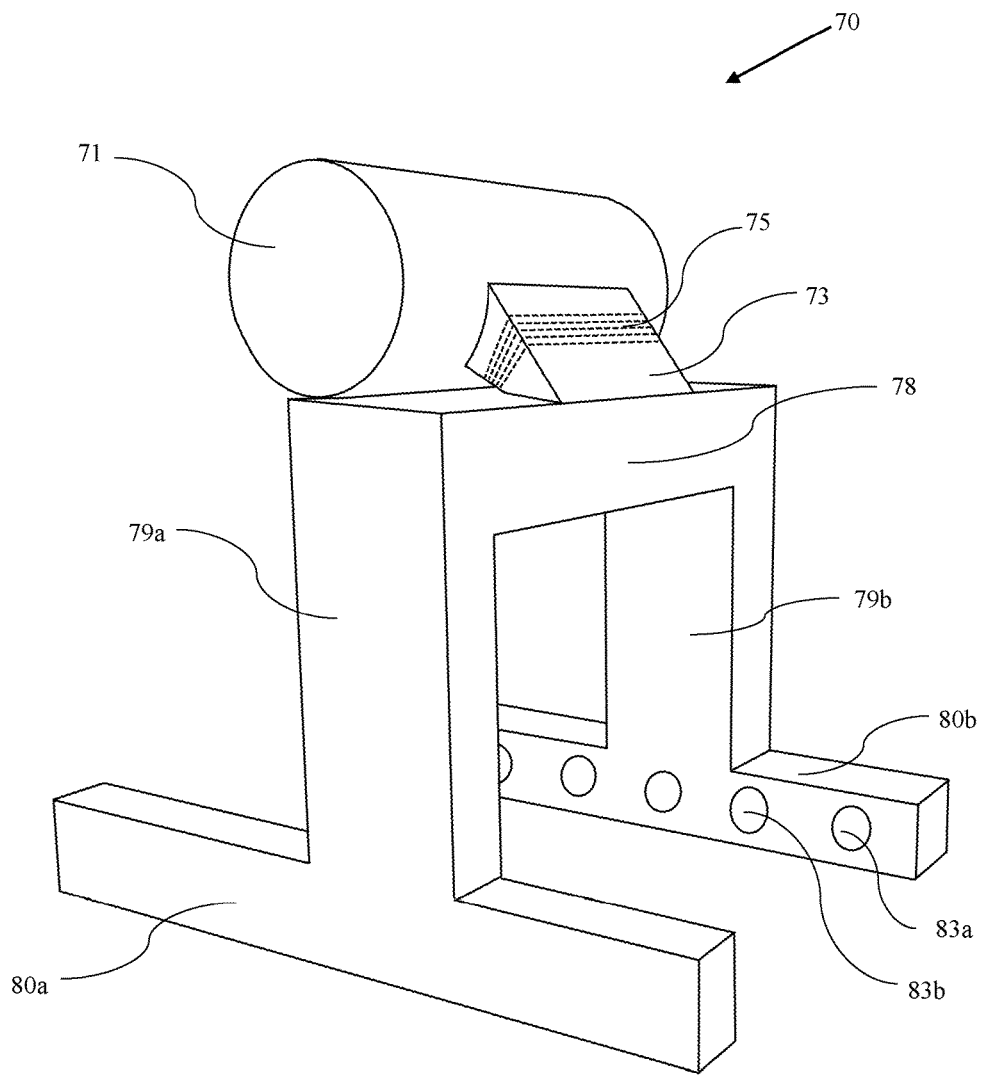
FIG. 4 is an isometric view of a convection system for the present invention.

RAP processor 1 optionally includes at least one convection system 70, seen in FIG. 4. The at least one convection system works to blow heat towards the used asphalt cement (RAP), providing convectional heat, which heats asphalt not directly contacting the induction plate, as well as allowing asphaltic concrete to retain heat as it leaves the induction plate. Convection system 70 consists of blower 71, with convection system input 72 attached to the blower input and convection blower output 73 disposed on the blower output.

Convection system input 72 can be a duct allowing air to collect from the interior lumen of RAP processor 1. Alternatively, convection system input 72 can comprise a duct transferring air from the interior of RAP processor 1 to a water condenser. The water condenser can be any system allowing water to separate from ambient air, such as an enclosed space disposed separately from the interior of the RAP processor.

Convection blower output 73 includes induction heating element 75 disposed within the interior of the output. Induction heating element 75 can be an induction heating plate disposed on the walls of the output, a plate, wire mesh, or heating tube disposed in the interior of the output, such that blower output air passed along the heating element.

Convection blower output 73 is in fluid communication with horizontal transfer tube 78, preferably at about the center of the horizontal transfer tube. First vertical transfer tube 79a is in fluid communication with a first end of horizontal transfer tube 78 and second vertical transfer tube 79b is in fluid communication with a second end of horizontal transfer tube 78. First output transfer tube 80a is in fluid communication with first vertical transfer tube 79a, and possesses a plurality of output jets 83. Second output transfer tube 80b is in fluid communication with second vertical transfer tube 79b, and possesses a plurality of output jets 83, for example first output jet 83a, second output jet 83b, etc.

Figure 5A:
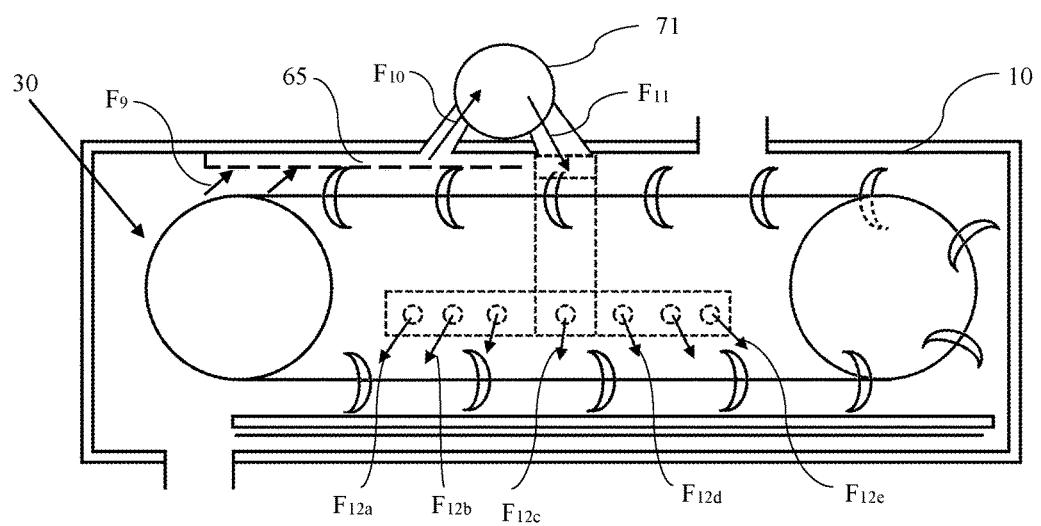
FIG. 5A is a cross sectional view of the asphalt recycling system and convection system.

Convection system 70 collects air from the interior of RAP processor 1. Heated air flows from the interior lumen of the processor along path $F_{10}$, seen in FIG. 5A. In some embodiments, air is collected in air recycle duct 65 disposed on the upper wall of heating chamber 5. Air recycle duct can provide a plurality of openings to collect air, or use openings on the ends of the duct. Recycle air flows into air recycle duct 65 via path F9 and moves through air recycle duct 65 to convection system input 72. Optionally, induction heating elements are disposed on convection system input 72, convection blower output 73, or both. It is also envisioned that radiant heat sources can be used to heat air in the induction system. The recycle air then moves into blower 71. Blower 71 moves the air though path $F_{11}$, which runs the air through induction heating element 75. The heated air is transferred along the transfer tubes of convection system 70 and is expelled from output jets 83. Advantageously, the plurality of output jets permit air to be directed along multiple paths, $F_{12a}$, $F_{12b}$, $F_{12c}$, $F_{12d}$, $F_{12e}$, etc., thereby heating the asphalt cement through convection heat as it traverses the length of induction plate 51.

Figure 5B:
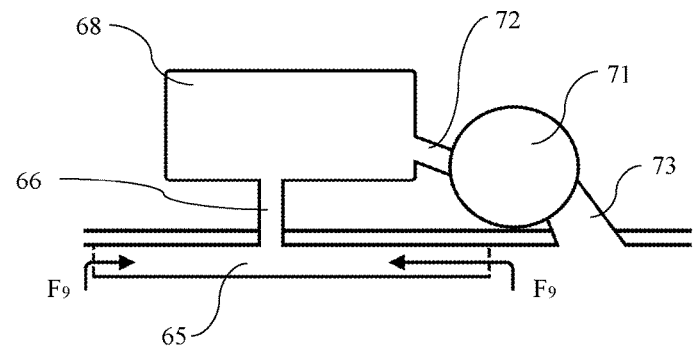
FIG. 5B is a cross sectional view of the asphalt recycling system with water condenser and convection system.

Alternatively, recycle air flows from air recycle duct 65 to air recycle input 66 and into water condenser 68, seen in FIG. 5B. Water condenser 68 allows the air to cool sufficiently to permit water in the air to precipitate out of the air, forming a dry recycle air. The water condenser is optionally cooled, such as through use of compressor coils, to extract water from the air. The water condenser optionally also includes an oil separator to remove oils from the water. The dry recycle air is then moved into convection system input 72 and acted upon by convention system 70.

The velocity of air flow expelled from blower 71 may be adjusted. For example, in some embodiments, blower 71 expels air at between about 10 and about 50 miles per hour. Further, in some embodiments the output jets are adjustable in air flow and/or direction, allowing for directed release of heated convection air from convection system 70, onto the asphaltic concrete. This allows convection system 70 to provide gradual application of convectional heat, thereby enabling controlled release of moisture from the used asphalt cement. In one embodiment, the convectional heat percolates moisture out of the used asphalt cement.

Additionally, convection system 70 is configured to recover excess heat that accumulates in the heating chamber, reusing the heat generated in the heating chamber. Recycling heat reduces excess heat discharge, and improves the efficiency of induction heating element 75 by about 20-30%. The shapes and dimensions of the blower are configured to facilitate intake of excess convectional heat for recapturing.

Example 4

Figure 6:
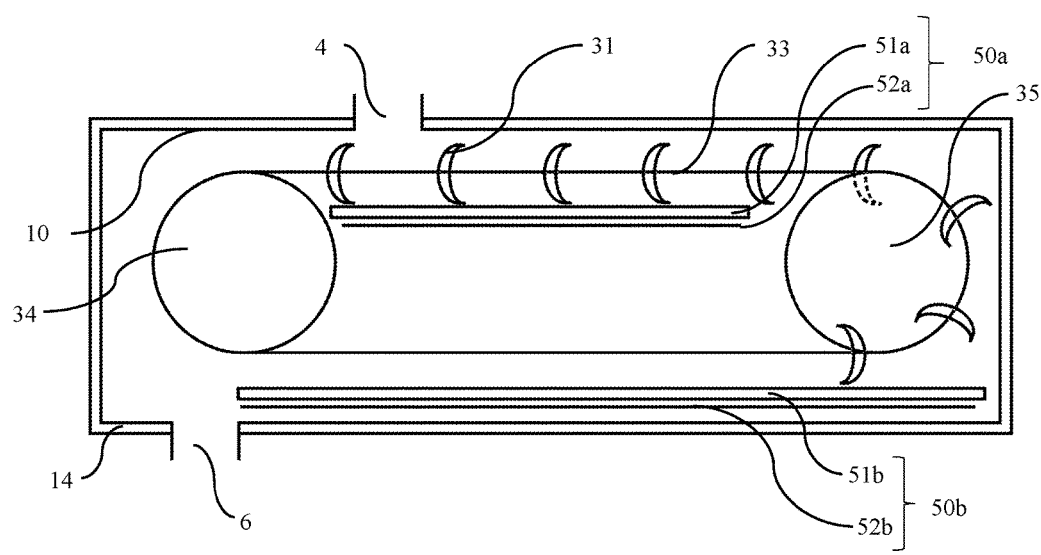
FIG. 6 is a cross sectional view of a second embodiment of the asphalt recycling system and heating system.

RAP processor 1 is composed of RAP transfer system 30, upper induction heating system 50a, and lower induction heating system 50b, as seen in FIG. 6. RAP processor 1 includes input 4 in chamber wall 10, for accepting asphalt—either as asphalt cement or asphaltic concrete—at one end of the RAP processor and output 5 in chamber wall 10, for releasing heated asphaltic concrete from RAP processor 1 approximately below input 4. Asphalt is transferred from an exterior source to upper induction heating system 50a, where it is initially heated. The heated asphaltic concrete is then transferred to lower induction heating system 50b, where final heating of the asphaltic concrete occurs.

RAP transfer system 30 comprises first chain sprocket set 34a and second chain sprocket set 34b on one end of the RAP processor and first ancillary chain sprocket set 35a and first ancillary chain sprocket set 35b on the opposite end of the RAP processor, as described in Examples 1 and 2. Paddle 31 is attached to paddle chain 33 as described in the previous Examples.

Figure 7A:
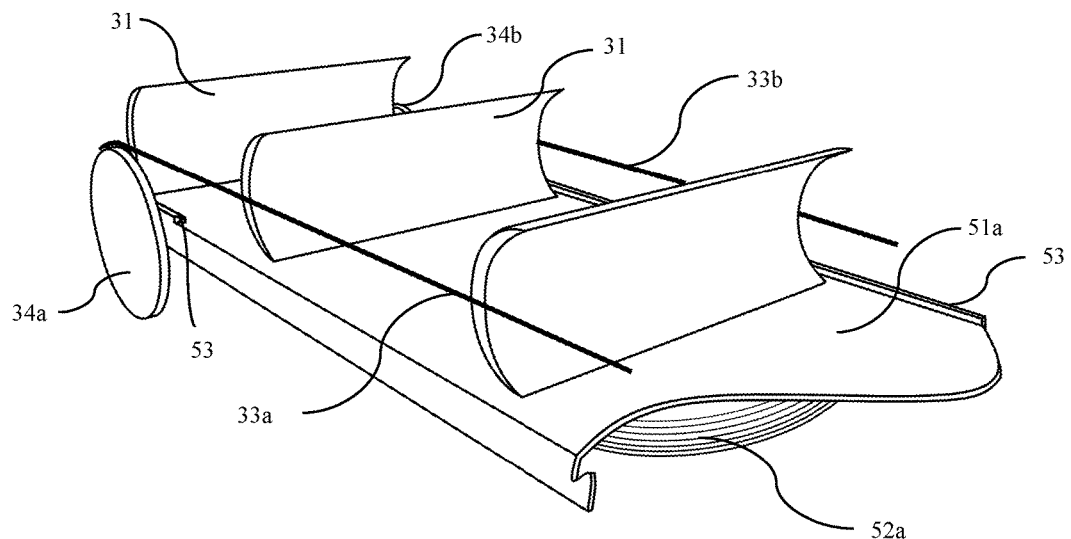
FIG. 7A is an isometric view of the upper induction heating system and the upper section of the RAP transfer system of the second embodiment of the asphalt recycling system.
Figure 7B:
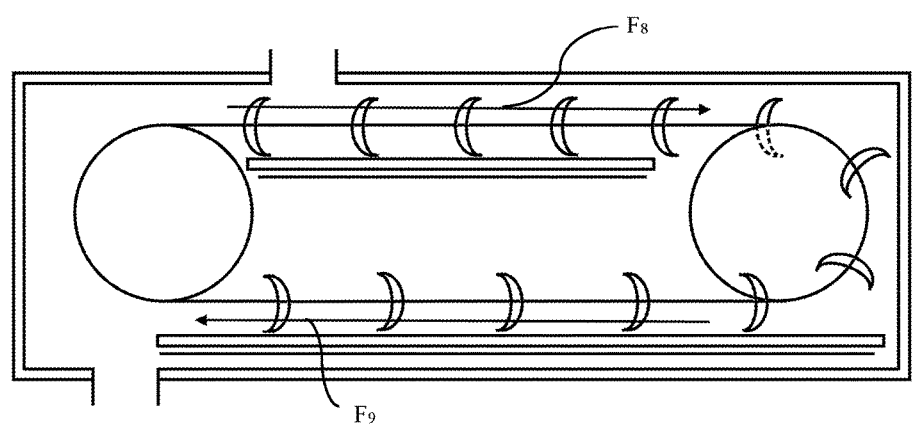
FIG. 7B is a cross sectional view of a second embodiment of the asphalt recycling system heating system showing the path of RAP transfer paddles through the RAP heating system.

Upper induction heating system 50a includes upper induction plate 51a mounted to the RAP processor such that paddle 31 scrapes asphaltic concrete from induction plate 51 when paddle 31 travels upper paddle path $F_8$, seen in FIG. 7A. Upper induction plate 51a runs substantially the length of the RAP processor, and ends before ancillary chain sprocket set 35, at ancillary chain sprocket set 35, or just after ancillary chain sprocket set 35, allowing the asphaltic concrete to drop to lower induction plate 51b, as seen in FIG. 7B. The upper induction plate fits between the sprocket sets. Upper induction coil 52a is disposed under upper induction plate 51a and provides magnetic fields that result in induction heating of upper induction plate 51a. To prevent asphalt cement from leaving path $F_8$, shown in FIG. 7B, channel rail 53 is disposed on the edges of upper induction plate 51a. Lower induction plate 51b is disposed on the lower horizontal wall of chamber wall 10, and of sufficient length to traverse the distance from output 6 to a distance sufficient to accept all asphaltic concrete dropping from upper induction plate 51a. Additionally, lower induction plate 51b is disposed such that paddle 31 scrapes asphaltic concrete from induction plate 51b when traversing lower paddle path $F_9$, seen in FIG. 7B. Lower induction coil 52b is disposed below lower induction plate 51b and provides magnetic fields that result in induction heating of lower induction plate 51b.

Figure 8:
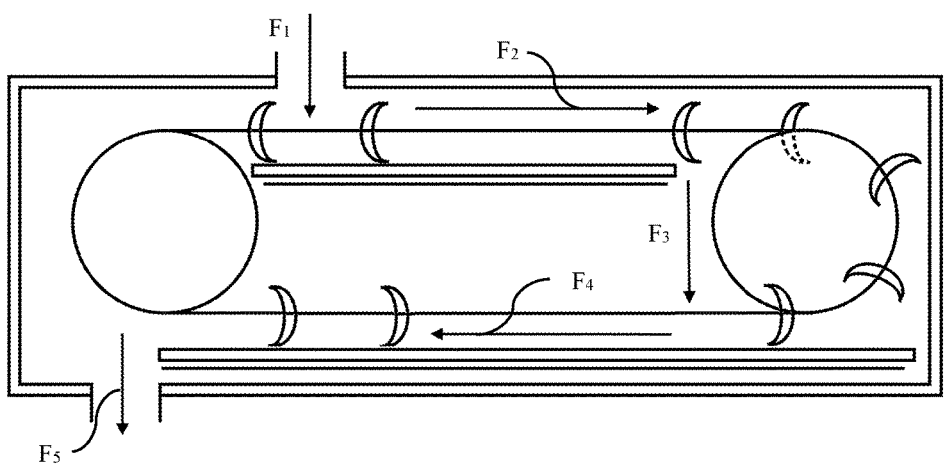
FIG. 8 is a cross sectional view of a second embodiment of the asphalt recycling system heating system showing the path of asphalt through the system.

Asphalt—as asphalt cement or asphaltic concrete—is introduced into RAP processor 1 at input 4, and travels along path $F_1$, as seen in FIG. 8. The asphalt lands onto upper induction plate 51a and is collected by paddle 31 and pushed along path $F_2$. Upper induction coil 52a, located below upper induction plate 51a heats upper induction plate 51a. Heat transfer from upper induction plate 51a heats the asphaltic concrete as it traverse path $F_2$. Once the asphaltic concrete reaches the end of upper induction plate 51a, the asphaltic concrete drops along path $F_3$ onto lower induction plate 51b. As with the upper induction system, lower induction coil 52b heats lower induction plate 51b causing heat transfer from lower induction plate 51b to heat asphalt cement as it traverse path $F_4$. The induction plates are sufficiently dimensioned to allow the asphalt cement to absorb heat gradually, i.e. the asphalt cement does not heat above about 400° F. Paddle 31 possess a U-shaped blade, as seen in FIGS. 2A through 3E, allowing paddle 31 to lift the asphaltic concrete during horizontal movement and churn the asphaltic concrete allowing for mixing of the asphaltic concrete as it traverses path $F_4$. Upon reaching the end of induction plate 51, the asphaltic concrete reaches output 6 and exits RAP processor 1 via path $F_5$. Due to the use of both an upper induction heating system and lower induction heating system, this embodiment allows each induction plate to have a smaller length, thereby translating into a smaller length for the RAP processor.

Where convection system 70 is used with this embodiment of the RAP processor, output jets 83 can be directed at the asphaltic concrete on both path $F_2$ and path $F_4$. However, output jets 83 are optionally directed only at asphaltic concrete traversing path $F_2$, i.e. only on asphaltic concrete on upper induction plate 51a. This prevents possible moisture in the convection system air from striking the asphalt cement traversing path $F_4$, resulting in the asphalt cement containing less moisture content as it exits output 6. RAP material is optionally transferred to rejuvenating/mixing chamber 97. Rejuvenating/mixing chamber 97 is cylindrical and possesses at least one rejuvenating/mixing induction heater 99 is disposed to provide heat to the asphaltic concrete as the cement is stirred and/or rejuvenated, and includes induction coils disposed adjacent to the outer walls of the rejuvenating/mixing chamber and tubing within the chamber to provide even heat to the asphaltic concrete. Additive bin 98 is in fluid communication with rejuvenating/mixing chamber 97 and provides for the addition of rejuvenation oil, Hydrolene H90T (HollyFrontier Corp., Tulsa, Okla.), to RAP and optionally other additives.

Example 5

Figure 9:
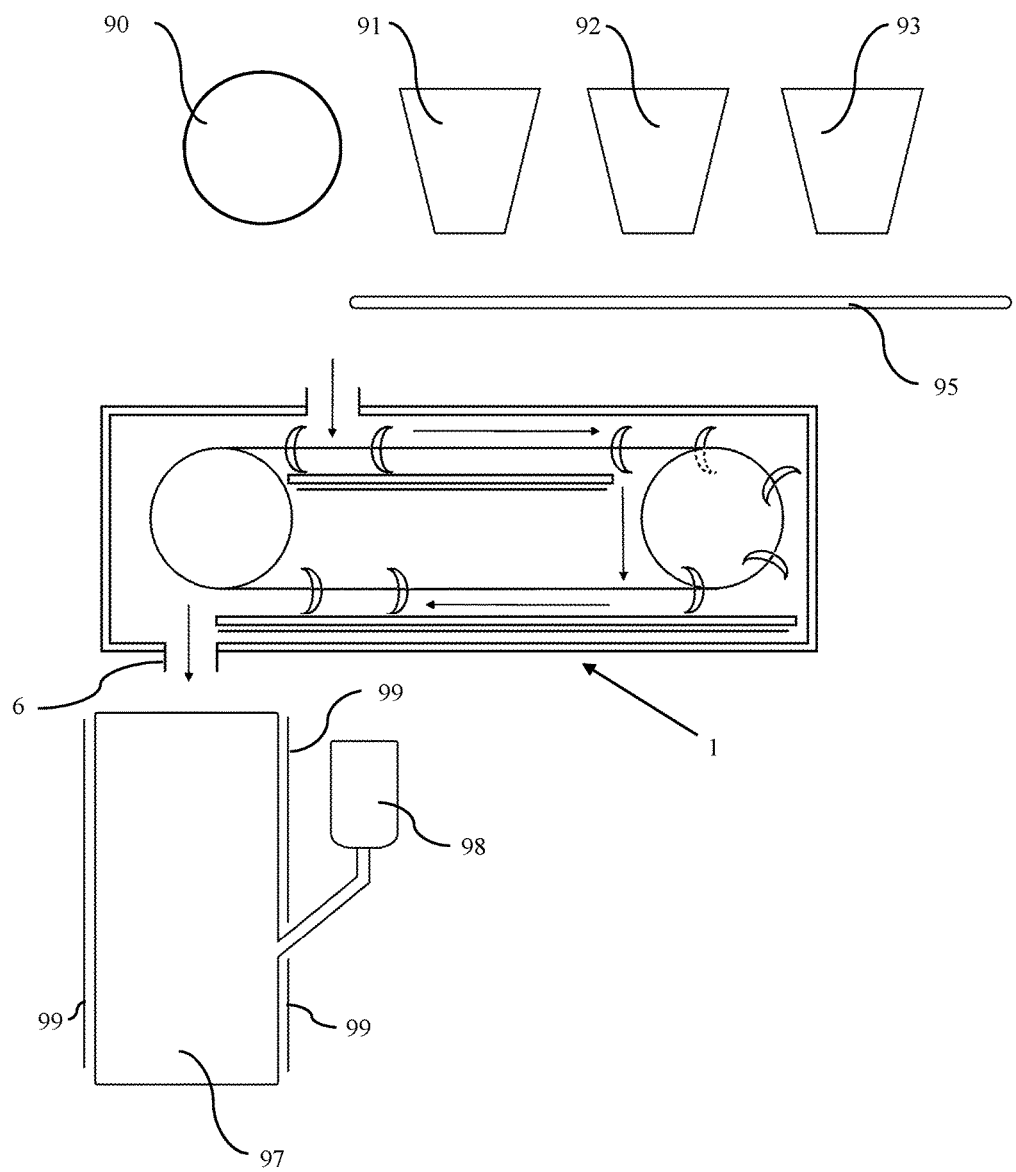
FIG. 9 is a cross sectional view of the asphalt recycling system with mixer.

RAP processor 1 can be integrated into a system for preparing asphaltic concrete. At least one component bin, such as asphalt cement tank 90, coarse aggregates bin 91, and medium aggregates bin 92, and fine aggregates bin 93, are disposed upstream of heating chamber 5, i.e. disposed to permit unloading of the at least one component form its bin into input 4. The at least one component bin is connected to input 4 through component conveyor 95. The at least one component bin possesses an output end disposed adjacent to component conveyor 95, thereby leading to input 4, as seen in FIG. 9. RAP processor 1 is as described in one of the previous Examples. Exit 6 is disposed adjacent to rejuvenating/mixing chamber 97, such that RAP exiting RAP processor 1 is collected in rejuvenating/mixing chamber 97.

Rejuvenating/mixing chamber 97 is heated through induction heat. At least one rejuvenating/mixing induction heater 99 is disposed to provide heat to the asphaltic concrete as the mix is stirred and/or rejuvenated, and includes induction coils disposed adjacent to the outer walls of the rejuvenating/mixing chamber and tubing within the chamber to provide even heat to the asphaltic concrete. Additive bin 98 is in fluid communication with rejuvenating/mixing chamber 97 and provides for the addition of rejuvenation oil to RAP and optionally other additives.

Example 6

Recycled asphaltic concrete is processed for use through RAP processor 1. Collected RAP is placed into asphaltic concrete bin 94. Additional components of the asphaltic concrete are placed in other bins, such as coarse aggregates bin 91, and fine aggregates bin 92. For example, the aggregates components may be 3% of ⅜ inch aggregates, 5% of ½ inch aggregates, and 5% of #50 sieve aggregates. Other optional components include ground shingle material. Aggregates of various sizes can be added to meet a particular mixture composition's volumetric requirements. For example, RAP and virgin asphalt cement can be combined with the aggregates material and processed through RAP processor 1 as described above.

Prior to loading of the asphaltic concrete mix into intake 4 of RAP processor 1, a predetermined quantity of RAP and coarse and fine aggregates, i.e., sand and aggregates, are measured and transferred to intake 4 via component conveyor 95. Optionally, asphalt cement is added to increase the amount of asphalt cement in the asphaltic concrete. The RAP and aggregates material are mixed on RAP transfer system 30, with paddle 31 which mixes the components by churning the mix. During the mixing, the asphaltic concrete is heated to about 325° F. through induction heating from induction heating system 50, or in some embodiments both induction heating system 50 and paddle 31.

The uniform heating of the used asphaltic concrete, due to the induction heating and mixing of the asphaltic concrete in RAP processor 1, prevents moisture from surging from the RAP and also helps to maintain the integrity of the subsequently formed rejuvenated asphalt cement. In this manner, surges of steam do not disrupt the recycling process. Further, the gradual heating reduces the likelihood of RAP fracture from violent surges of moisture loss. The asphaltic concrete exits RAP processor 1 through output 6 and is immediately transferred to rejuvenating/mixing chamber 97, such as a pug mill.

The asphaltic concrete is then transferred to rejuvenating/mixing chamber 97 and rejuvenating oil added to restore the biding properties of the RAP. The rejuvenating oil reduces oxidation of the asphalt cement resulting in more elastic and flexible asphalt binder, returning the asphalt cement to original state when it was originally manufactured. The RAP is further mixed and heated through induction heat applied via the rejuvenating/mixing induction heater 99 to a final asphalt work mix. For example, the work mix leaves rejuvenating/mixing chamber 97 at between 300° F. and 400° F. to ensure the work mix reaches the job site at around 290° F.

Example 7

Virgin asphalt is processed for use through RAP processor 1. The liquid virgin cement is placed into asphalt cement tank 90 and additional components added in storage bins, such as coarse aggregates bin 91, and fine aggregates bin 92, as described in Example 6. A predetermined quantity of asphalt cement and coarse and fine aggregates are measured and transferred to intake 4 via component conveyor 95, where the asphalt cement and aggregates material are mixed on RAP transfer system 30, as described above. During the mixing, the asphaltic concrete is heated to about 325° F. through induction heating. The asphaltic concrete exits RAP processor 1 through output 6 and is immediately transferred to rejuvenating/mixing chamber 97.

Additional aggregates or asphalt cement can be added to meet a particular mixture composition's volumetric requirements. For example, additional virgin asphalt cement can be processed through RAP processor 1 as described above, and added.

The virgin asphalt cement and aggregates material is further mixed and heated through induction heat applied via the rejuvenating/mixing induction heater 99 to a final asphalt work mix. For example, the work mix leaves rejuvenating/mixing chamber 97 at between 300° F. and 400° F. to ensure the work mix reaches the job site at around 290° F.

Example 8

Virgin asphalt is processed for use through RAP processor 1. The liquid virgin asphalt cement is placed into asphalt cement tank 90 and additional components added in other bins, such as coarse aggregates bin 91, and fine aggregates bin 92, as described in Example 6. A predetermined quantity of asphalt cement and coarse and fine aggregates are measured and transferred to intake 4 via component conveyor 95, where the asphalt cement and aggregates material are mixed on RAP transfer system 30, as described above. During the mixing, the asphaltic concrete is heated to about 250° F., with a 10% variation, through induction heating to form a warm asphaltic concrete. The asphaltic concrete exits RAP processor 1 through output 6 and is immediately transferred to rejuvenating/mixing chamber 97.

Additional aggregates or asphalt cement can be added to meet a particular mixture composition's volumetric requirements. For example, additional virgin asphalt can be processed through RAP processor 1 as described above, and added.

The virgin asphalt cement and aggregates material is further mixed and heated through induction heat applied via the rejuvenating/mixing induction heater 99 to a final asphalt work mix. For example, the work mix leaves rejuvenating/mixing chamber 97 at between 225° F. and 320° F. to ensure the work mix reaches the job site at around 220° F.

Example 9

A combination of recycled asphaltic concrete and virgin asphalt cement is processed for use through RAP processor 1. Collected RAP is placed into asphaltic concrete bin 94, with virgin asphalt cement placed into asphalt tank 90. Additional components of the asphaltic concrete, as described above, are placed in other bins, such as coarse aggregates bin 91, and fine aggregates bin 92. A combination of virgin asphalt cement and RAP are loaded into RAP processor 1, along with aggregates material. The RAP and virgin asphalt can be provided in any ratio, such as 90% RAP and 10% virgin asphalt cement.

The asphalt and aggregates material are loaded into RAP processor 1 and mixed on RAP transfer system 30, using paddle 31, as described previously. The asphaltic concrete exits RAP processor 1 through output 6 and is immediately transferred to rejuvenating/mixing chamber 97.

Rejuvenating oil added to improve the rheological properties of the asphalt cement the binding properties of the RAP. Additional aggregates of various sizes can be added to meet a particular mixture composition's volumetric requirements. In the event more binder is required, virgin asphalt or rejuvenated RAP is added. The RAP is mixed and heated through induction heat applied via the rejuvenating/mixing induction heater 99 to a final asphalt work mix. The work mix leaves rejuvenating/mixing chamber 97 at between 300° F. and 400° F. to ensure the work mix reaches the job site at around 290° F.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosure of all publications cited above are expressly incorporated herein by reference, each in its entirety, to the same extent as if each were incorporated by reference individually.

It is also to be understood that the following claims are intended to cover all of the generic and specific features of the invention herein described, and all statements of the scope of the invention which, as a matter of language, might be said to fall therebetween.

What is claimed is:

1. An asphalt processing system, comprising:
    a heating chamber, wherein the heating chamber further comprises:
        a horizontal floor;
        a first vertical wall having a lower edge disposed on a first edge of the horizontal floor;
        a second vertical wall having a lower edge disposed on a second edge of the horizontal floor;
        a third vertical wall having a lower edge disposed on a third edge of the horizontal floor;
        a fourth vertical wall having a lower edge disposed on a fourth edge of the horizontal floor;
        a horizontal ceiling disposed on an upper edge of the first vertical wall, the second vertical wall, the third vertical wall, and the fourth vertical wall;
        an input opening disposed on the horizontal ceiling or one of the vertical walls;
        an output opening disposed on the horizontal floor or within a lower half of one of the vertical walls;
    a transfer system, comprising:
        a plurality of sockets rotatably disposed in the interior of the heating chamber;
        at least one drive member in communication with the plurality of sockets;
        at least one transfer unit mounted to the at least one drive member;
            wherein the at least one transfer unit is a paddle, U-shaped flight, or combination thereof, and wherein the paddle, U-shaped flight, or combination thereof is disposed adjacent to the at least one induction plate and designed to scrape against the at least one induction plate thereby mixing the asphalt;
    an induction heating system, comprising:
        at least a first induction plate composed of a magnetic material adapted to heat upon exposure to magnetic forces; and at least a first induction heating coil disposed in the interior of the heating chamber, and in magnetic communication with the at least a first induction plate.

2. The asphalt processing system of claim 1, wherein at least one of the plurality of sockets is in mechanical communication with a drive system.

3. The asphalt processing system of claim 2, wherein the at least one of the plurality of sockets is attached to a drive shaft, where the drive shaft rotatably extends through one of the vertical walls of the heating chamber; and
wherein the drive shaft is attached to a drive motor.

4. The asphalt processing system of claim 1, wherein the at least one drive member is a drive chain, a plurality of drive chains, a drive cable, or a plurality of drive cables.

5. The asphalt processing system of claim 1, further comprising insulation disposed on the exterior of the heating chamber, wherein the insulation is alumina-silica insulation, cellulose insulation, or combinations thereof.

6. The asphalt processing system of claim 1, wherein the induction heating system, further comprises:
at least a second induction plate composed of a magnetic material adapted to heat upon exposure to magnetic forces, disposed in the interior of the heating chamber, wherein the at least a second induction plate is disposed above the at least a first induction plate;
at least a second induction heating coil disposed in the interior of the heating chamber, and in magnetic communication with the at least a second induction plate.

7. The asphalt processing system of claim 6, wherein a first induction plate is disposed about the floor of the heating chamber; and
wherein the second induction plate is disposed about in the middle of the heating chamber.

8. The asphalt processing system of claim 1, wherein the at least a first induction plate is ferromagnetic.

9. The asphalt processing system of claim 1, further comprising at least one convection system, wherein the at least one convection system comprises:
a convection system input in fluid communication with the interior of the heating chamber;
a blower in fluid communication with the convection system input, wherein the blower comprises a blower input, a fan, and a blower output; and
a convection system output in fluid communication with the blower output.

10. The asphalt processing system of claim 9, further comprising at least one heating element, wherein the at least one heating element is disposed in the convection system input or adjacent to the blower output.

11. The asphalt processing system of claim 10, wherein the at least one heating element is an induction heating element comprising:
at least one convection induction plate disposed on the walls of the convection system output;
at least one convection induction plate disposed in the interior of the convection system output,
at least one convection induction wire mesh disposed in the interior of the convection system output; or
at least one convection induction heating tube disposed in the interior of the convection system output.

12. The asphalt processing system of claim 10, wherein the at least one heating element is an induction heating element comprising:
at least one convection induction plate disposed on the walls of the convection system input;
at least one convection induction plate disposed in the interior of the convection system input,
at least one convection induction wire mesh disposed in the interior of the convection system input; or
at least one convection induction heating tube disposed in the interior of the convection system input.

13. The asphalt processing system of claim 9, further comprising a plurality of ducts, wherein the plurality of ducts comprise:
a horizontal transfer tube in fluid communication with the blower output;
wherein the horizontal transfer tube has a first transfer end and a second transfer end;
a first vertical transfer tube in fluid communication with the first transfer end;
wherein the first vertical transfer tube has an upper first transfer tube end and a lower first transfer tube end;
a second vertical transfer tube in fluid communication with the second transfer end;
wherein the second vertical transfer tube has an upper second transfer tube end and a lower second transfer tube end;
a plurality of output jets, wherein the plurality of output jets are disposed on the lower first transfer tube end and the lower second transfer tube end.

14. The asphalt processing system of claim 9, wherein the convection system input further comprises at least one duct, wherein the at least one duct is disposed on the horizontal ceiling of the heating chamber.

15. The asphalt processing system of claim 9, wherein the convection system input further comprises a duct transferring air from the interior of the heating chamber to a water condenser.

16. The asphalt processing system of claim 9, wherein the convection system output is disposed along the first half of the at least a first induction plate or disposed on an upper induction plate.

17. The asphalt processing system of claim 9, wherein the convection system output is disposed along the at least a first the induction plate.

18. A method of manufacturing an asphaltic concrete, comprising:
providing as asphalt, wherein the asphalt is asphaltic concrete or asphalt cement;
adding an asphaltic concrete mix into an asphalt processing system, comprising:
a heating chamber, wherein the heating chamber further comprises:
a horizontal floor;
a first vertical wall having a lower edge disposed on a first edge of the horizontal floor;
a second vertical wall having a lower edge disposed on a second edge of the horizontal floor;
a third vertical wall having a lower edge disposed on a third edge of the horizontal floor;
a fourth vertical wall having a lower edge disposed on a fourth edge of the horizontal floor;
a horizontal ceiling disposed on an upper edge of the first vertical wall, the second vertical wall, the third vertical wall, and the fourth vertical wall;
an input opening disposed on the horizontal ceiling or one of the vertical walls;
an output opening disposed on the horizontal floor or within a lower half of one of the vertical walls;
a transfer system, comprising:
a plurality of sockets rotatably disposed in the interior of the heating chamber;

at least one drive member in communication with the plurality of sockets;

at least one transfer unit mounted to the at least one drive member;

wherein the at least one transfer unit is a paddle, U-shaped flight, or combination thereof, and wherein the paddle, U-shaped flight, or combination thereof is disposed adjacent to the at least one induction plate and designed to scrape against the at least one induction plate thereby mixing the asphalt;

an induction heating system, comprising:

at least a first induction plate composed of a magnetic material adapted to heat upon exposure to magnetic forces;

at least a first induction heating coil disposed in the interior of the heating chamber, and in magnetic communication with the at least a first induction plate;

applying a magnetic field to the induction heating system to heat the at least a first induction plate;

placing the asphaltic concrete mix onto the at least a first induction plate, wherein the at least a first induction plate is between 300° F. and 350° F.;

moving the asphaltic concrete mix along the induction heating element, wherein the asphaltic concrete mix is mixed while moving;

heating the asphaltic concrete mix to between 300~ F. and 350~ F. to form a heated mix; and expelling the heated mix from the asphalt processing system.

19. The method of claim 18, wherein the asphalt is reclaimed asphalt pavement, virgin asphalt or a combination thereof.

20. The method of claim 18, wherein the asphaltic concrete mix is churned by the linear movement of the at least one transfer unit, wherein the at least one transfer unit is a U-shaped flight possessing a U-shaped leading face adapted to enable the churning of the asphaltic concrete mix.

21. The method of claim 18, further comprising modifying the heated mix, comprising the steps:

placing the heated mix into a rejuvenation chamber;

adding at least one modifier to the asphaltic heated mix, wherein the at least one modifier is virgin asphalt cement, coarse aggregates, fine aggregates, and mixing the heated mix and at least one modifier to form a modified heated mix.

22. The method of claim 21, further comprising heating the rejuvenation chamber, wherein the heating of the rejuvenation chamber comprises:

providing at least one rejuvenation induction heating plate composed of a magnetic material adapted to heat upon exposure to magnetic forces, where the at least one rejuvenation induction heating plate is in thermal contact with the rejuvenation chamber, providing at least one rejuvenation induction heating coil in in magnetic communication with the at least one rejuvenation induction heating plate, applying a magnetic field to heat the at least one rejuvenation induction heating plate.

23. The method of claim 18, further comprising heating the asphaltic concrete mix with heated air, comprising:

providing at least one convection system, wherein the at least one convection system comprises:

a convection system input in fluid communication with the interior of the heating chamber, a blower in fluid communication with the convection system input, wherein the blower comprises a blower input, a fan; and a blower output;

a convection system heating element;

a convection system output in fluid communication with the blower output;

collecting air from the interior of the heating chamber in the convection system input;

passing the air over the convection system heating element; and expelling heated air into the interior of the heating chamber.

24. The method of claim 23, wherein the at least one heating element is disposed in the convection system input or adjacent to the blower output.

25. The method of claim 23, wherein the at least one heating element is an induction heating element comprising:

at least one convection induction plate disposed on the walls of the convection system output;

at least one convection induction plate disposed in the interior of the convection system output;

at least one convection induction wire mesh disposed in the interior of the convection system output; or at least one convection induction heating tube disposed in the interior of the convection system output.

26. The method of claim 25, further comprising extracting moisture from the air; comprising:

providing a water condenser; wherein the water condenser further comprises:

a duct in fluid communication from the interior of the heating chamber or in fluid communication with the convection system input;

a condensing chamber adapted to condense water; where the condensing chamber is in fluid communication with the duct;

a dry air exit; in communication with the condensing chamber and the duct;

drawing air into the condensing chamber;

permitting moisture in the air to condense; and returning the air to the at least one convection system.

27. The method of claim 18, further comprising adding at least one rejuvenating oil to the asphalt, wherein the at least one rejuvenating oil is:

naphthenic-based oil formed of heavy naphthenic distillate solvent extract and heavy naphthenic petroleum distillate, an emulsion of hydrotreated heavy naphthenic petroleum distillate and heavy naphthenic distillate solvent extract in a cationic water solution, an anionic emulsions of water with asphalt and heavy naphthenic distillate solvent extract, an oil composed of heavy paraffinic distillate solvent extract, an oil composed of residual oil solvent extract, a paraffinic oil composed of heavy paraffinic petroleum neutral distillate solvents, petroleum-based motor oils, a mixture of acids and oils, or combinations thereof, wherein the mixture of acids and oils is composed of long chain and tricyclic organic acids, resin acids, fatty acids, esterified fatty acids and vegetable oils.

* * * * *